US009852095B2

(12) United States Patent
Abali et al.

(10) Patent No.: US 9,852,095 B2
(45) Date of Patent: Dec. 26, 2017

(54) SUSPEND AND RESUME IN A TIME SHARED COPROCESSOR

(71) Applicant: International Business Machines Corporation, Armonk, NY (US)

(72) Inventors: Bulent Abali, Tenafly, NJ (US); Craig B. Agricola, Essex, VT (US); Bartholomew Blaner, Underhill Center, VT (US); Kenneth A. Lauricella, Colchester, VT (US); John J. Reilly, Huntington, VT (US); Dorothy M. Thelen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/949,179

(22) Filed: Nov. 23, 2015

(65) Prior Publication Data

US 2017/0115924 A1 Apr. 27, 2017

Related U.S. Application Data

(63) Continuation of application No. 14/924,672, filed on Oct. 27, 2015.

(51) Int. Cl.
 *G06F 13/36* (2006.01)
 *G06F 13/362* (2006.01)
 (Continued)

(52) U.S. Cl.
 CPC .......... *G06F 13/362* (2013.01); *G06F 3/0608* (2013.01); *G06F 3/0632* (2013.01);
 (Continued)

(58) Field of Classification Search
 CPC .................................................. G06F 11/1402
 See application file for complete search history.

(56) References Cited

U.S. PATENT DOCUMENTS

| 7,565,659 B2 | 7/2009 | Day et al. |
| 7,692,561 B2 | 4/2010 | Biran et al. |
| (Continued) | | |

FOREIGN PATENT DOCUMENTS

WO 9512854 A1 5/1995

OTHER PUBLICATIONS

Software Patent Institute et al.; "Hardware Support for Interprocess Communication"; An IP.com Prior Art Database Technical Disclosure; http://ip.com/IPCOM/000161123; Dec. 8, 2007.
(Continued)

*Primary Examiner* — Henry Tsai
*Assistant Examiner* — Juanito Borromeo
(74) *Attorney, Agent, or Firm* — Matthew C. Zehrer

(57) ABSTRACT

Multiple clients may attempt to utilize a coprocessor engine within a coprocessor simultaneously. However, each engine may accomplish the particular function for which it is designed for one client at a time. Therefore, to transition from performing coprocessor engine operations between clients, the coprocessor engine may be suspended from performing operations for a first client so that it may begin performing operations for a second client. Prior to such transition, the coprocessor engine saves metadata about its operation state at the time of the suspend. At a subsequent time, when operations for the first client are to resume, the operating state of the coprocessor engine is determined utilizing the metadata and operations for the first client resume.

8 Claims, 11 Drawing Sheets

(51) Int. Cl.
*G06F 3/06* (2006.01)
*G06F 9/54* (2006.01)

(52) U.S. Cl.
CPC .......... *G06F 3/0644* (2013.01); *G06F 3/0656* (2013.01); *G06F 3/0683* (2013.01); *G06F 9/543* (2013.01)

(56) References Cited

U.S. PATENT DOCUMENTS

| 2013/0185319 A1 | 7/2013 | Reilly |
| 2014/0068302 A1 | 3/2014 | Falik et al. |
| 2015/0052268 A1 | 2/2015 | Brown et al. |

OTHER PUBLICATIONS

IBM et al.; "Working-Set Coprocessor"; An IP.com Prior Art Database Technical Disclosure; http://ip.com/IPCOM/000036171; Jan. 28, 2005.

Mell, Peter, et al, "The NIST Definition of Cloud Computing Recommendations of the National Institute of Standards and Technology," Sep. 2011.

List of IBM Patents or Patent Applications Treated as Related.

SUSPEND AND RESUME IN A TIME SHARED COPROCESSOR

FIELD OF THE INVENTION

Embodiments of the invention generally relate to computer systems and more particularly to managing a suspend and subsequent resume of functionality of a timeshared coprocessor in a computing system including a processor and the coprocessor that share system memory.

DESCRIPTION OF THE RELATED ART

Heterogeneous computing systems combine different types of compute elements that share memory. A specific class of heterogeneous systems pairs traditional general-purpose processing cores and coprocessors. While this arrangement enables significant gains in application performance, device driver overheads and operating system code path overheads can become prohibitive.

Some coprocessors are able to service numerous clients (e.g., software applications, end users, partitions, or the like) and may be referred to as timeshared coprocessors. With the increasing number of clients that these coprocessors may service, efficiently managing the functionality of such coprocessors is increasingly difficult.

SUMMARY

In an embodiment of the present invention, a method of arbitrating first client and second client access to a compression and decompression engine within a coprocessor and saving coprocessor state metadata describing the contents of the compression and decompression engine to system memory connected to the coprocessor and to a processor when suspending first client access and allowing second client access to the compression and decompression engine includes retaining a copy of data currently within a history first-in-first-out (FIFO) buffer within system memory, suspending compression operations of the compression and decompression engine by stopping data from entering the history FIFO buffer, upon the suspend of compression operations, clearing contents of the history FIFO, and writing a target empty bit count (TEBC) to system memory, the TEBC indicating the quantity of padding bits in the most recent compressed output from the compression and decompression engine.

In yet another embodiment a method of arbitrating first client and second client access to a compression and decompression engine within a coprocessor and saving coprocessor state metadata describing the contents of the compression and decompression engine to system memory connected to the coprocessor and to a processor when suspending first client access and allowing second client access to the compression and decompression engine includes retaining a copy of a data decompression table utilized to decompress data within a history first-in-first-out (FIFO) buffer to system memory, suspending decompression operations of the compression and decompression engine by stemming data from entering the history FIFO buffer, upon the suspend of decompression operations, clearing contents of the history FIFO buffer and clearing contents of the decompression table, and writing a source unprocessed bit count (SUBC) and writing a source final block type (SFBT) to system memory, the SUBC indicating the amount of compressed data ingested by the compression and decompression engine that was not decompressed, and the SFBT indicating a type of block that was being decoded upon the suspending first client access to the compression and decompression engine.

These and other embodiments, features, aspects, and advantages will become better understood with reference to the following description, appended claims, and accompanying drawings.

DETAILED DESCRIPTION

Embodiments related to arbitrating access between multiple clients attempting to utilize a coprocessor engine within a coprocessor simultaneously. Since each engine may accomplish the particular function for which it is designed for one client at a time, the coprocessor engine transitions from performing coprocessor engine operations between clients by suspending operations for a first client so that it may begin performing operations for a second client. Prior to such transition, the coprocessor engine saves metadata about its operation state at the time of the suspend. At a subsequent time, when operations for the first client are to resume, the operating state of the coprocessor engine is determined utilizing the metadata and operations for the first client resume.

Figure 1:
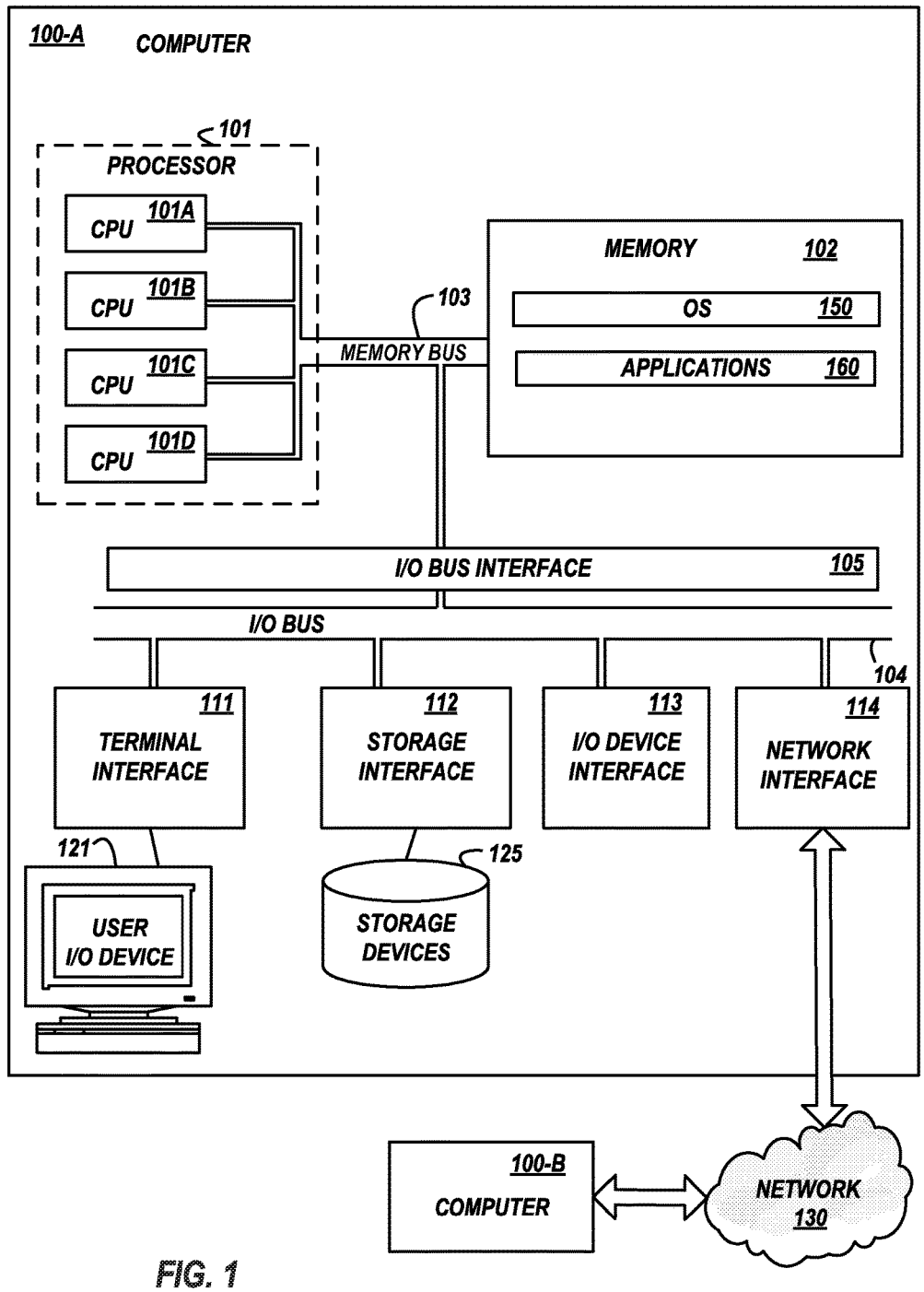
FIG. 1 illustrates a high-level block diagram of an exemplary computer system for implementing various embodiments of the invention.

Referring to the Drawings, wherein like numbers denote like parts throughout the several views, FIG. 1 depicts a high-level block diagram representation of a computer 100-A connected to another computer 100-B via a network 130, according to an embodiment of the present invention.

The term "computer" is used herein for convenience only, and in various embodiments is a more general data handling system, such as a mobile phone, tablet, server computer, etc. The mechanisms and apparatus of embodiments of the present invention apply equally to any appropriate data handling system. Further, recitations of computer 100 generically refer to a computer and specific recitation of computer 100-A, 100-B, indicate specific computer 100 instances.

The major components of the computer 100 may comprise one or more processors 101, a system memory 102, a terminal interface 111, a storage interface 112, an I/O (Input/Output) device interface 113, and a network interface 114, all of which are communicatively coupled, directly or indirectly, for inter-component communication via a memory bus 103, an I/O bus 104, and an I/O bus interface unit 105. The computer 100 contains one or more general-purpose programmable central processing units (CPUs) 101A, 101B, 101C, and 101D, herein generically referred to as processor 101. In an embodiment, the computer 100 contains multiple processors 101 typical of a relatively large system; however, in another embodiment the computer 100 may alternatively be a single processor 101 system. Each processor 101 executes instructions stored in the system memory 102 and may comprise one or more levels of on-board cache. The computer 100-A further includes a coprocessor as is further described herein. Generally, the coprocessor also executes instructions stored in the system memory 102 and may comprise one or more levels of on-board cache. The coprocessor generally allows the processor 101 to offload the execution of instructions stored in the system memory 102 to the coprocessor allowing the processor 101 to execute other instructions stored in the system memory 102 or upon data that was previously executed by the coprocessor or upon data that will be subsequently executed by the coprocessor. This offloading to the coprocessor generally allows for accelerated execution of particular instructions stored in the system memory 102. As such, the coprocessor may also be referred to as an accelerator, acceleration unit, or the like.

In an embodiment, the system memory 102 may comprise a random-access semiconductor memory, storage device, or storage medium for storing or encoding data and programs. In another embodiment, the system memory 102 represents the entire virtual memory of the computer 100, and may also include the virtual memory of other computer systems coupled to the computer 100 or connected via the network 130. The system memory 102 is conceptually a single monolithic entity, but in other embodiments the system memory 102 is a more complex arrangement, such as a hierarchy of caches and other memory devices. For example, memory 102 may exist in multiple levels of caches, and these caches may be further divided by function, so that one cache holds instructions while another holds non-instruction data, which is used by the processor 101 and/or coprocessors. Memory may be further distributed and associated with different processors 101 or sets of processors 101, as is known in any of various so-called non-uniform memory access (NUMA) computer architectures.

The system memory 102 stores or encodes an operating system 150, an application 160, and/or other program instructions. Although the operating system 150, application 160, etc. are illustrated as being contained within the memory 102 in the computer 100, in other embodiments some or all of them may be on different computer systems and may be accessed remotely, e.g., via the network 130. The computer 100 may use virtual addressing mechanisms that allow the programs of the computer 100 to behave as if they only have access to a large, single storage entity instead of access to multiple, smaller storage entities. Thus, while operating system 150, application 160, or other program instructions are illustrated as being contained within the system memory 102, these elements are not necessarily all completely contained in the same storage device at the same time. Further, although operating system 150, application 160, other program instructions, etc. are illustrated as being separate entities, in other embodiments some of them, portions of some of them, or all of them may be packaged together.

In an embodiment, operating system 150, application 160, and/or other program instructions comprise instructions or statements that execute on the processor 101 and/or the coprocessor or instructions or statements that are interpreted by instructions or statements that execute on the processor 101 and/or the coprocessor, to carry out the functions as further described below. When such program instructions are able to be run by the processor 101 or the coprocessor, such computer 100 becomes a particular machine configured to carry out such instructions.

One or more processors 101 may function as a general-purpose programmable graphics processor unit (GPU) that builds images (e.g. a GUI) for output to a display. The GPU, working in conjunction with one or more applications 160, determines how to manipulate pixels on e.g. display, touch screen, etc. to create a display image or user interface. Ultimately, the image (e.g. GUI, etc.) is displayed to a user via a user I/O device 121. The processor 101 and GPU may be discrete components or may be integrated into a single component.

The memory bus 103 provides a data communication path for transferring data among the processor 101, the system memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100, and may receive output data via the user output devices. For example, a user interface may be presented via the user I/O device 121, such as displayed on a display device, played via a speaker, or printed via a printer. The user interface may be a user interface that provides content to a user visually (e.g. via a screen), audibly (e.g. via a speaker), and/or via touch (e.g. vibrations, etc.). In some embodiments, the computer 100 itself acts as the user interface as the user may move the computer 100 in ways to interact with, input, or manipulate computer application 160 data, function, etc.

The storage interface unit 112 supports the attachment of one or more local disk drives or secondary storage devices 125. In an embodiment, the secondary storage devices 125 are rotating magnetic disk drive storage devices, but in other embodiments they are arrays of disk drives configured to appear as a single large storage device to a host computer, or any other type of storage device. The contents of the system memory 102, or any portion thereof, may be stored to and retrieved from the secondary storage devices 125, as needed. The local secondary storage devices 125 have a slower access time than does the memory 102, meaning that the time needed to read and/or write data from/to the memory 102 is less than the time needed to read and/or write data from/to for the local secondary storage devices 125.

Figure 2:
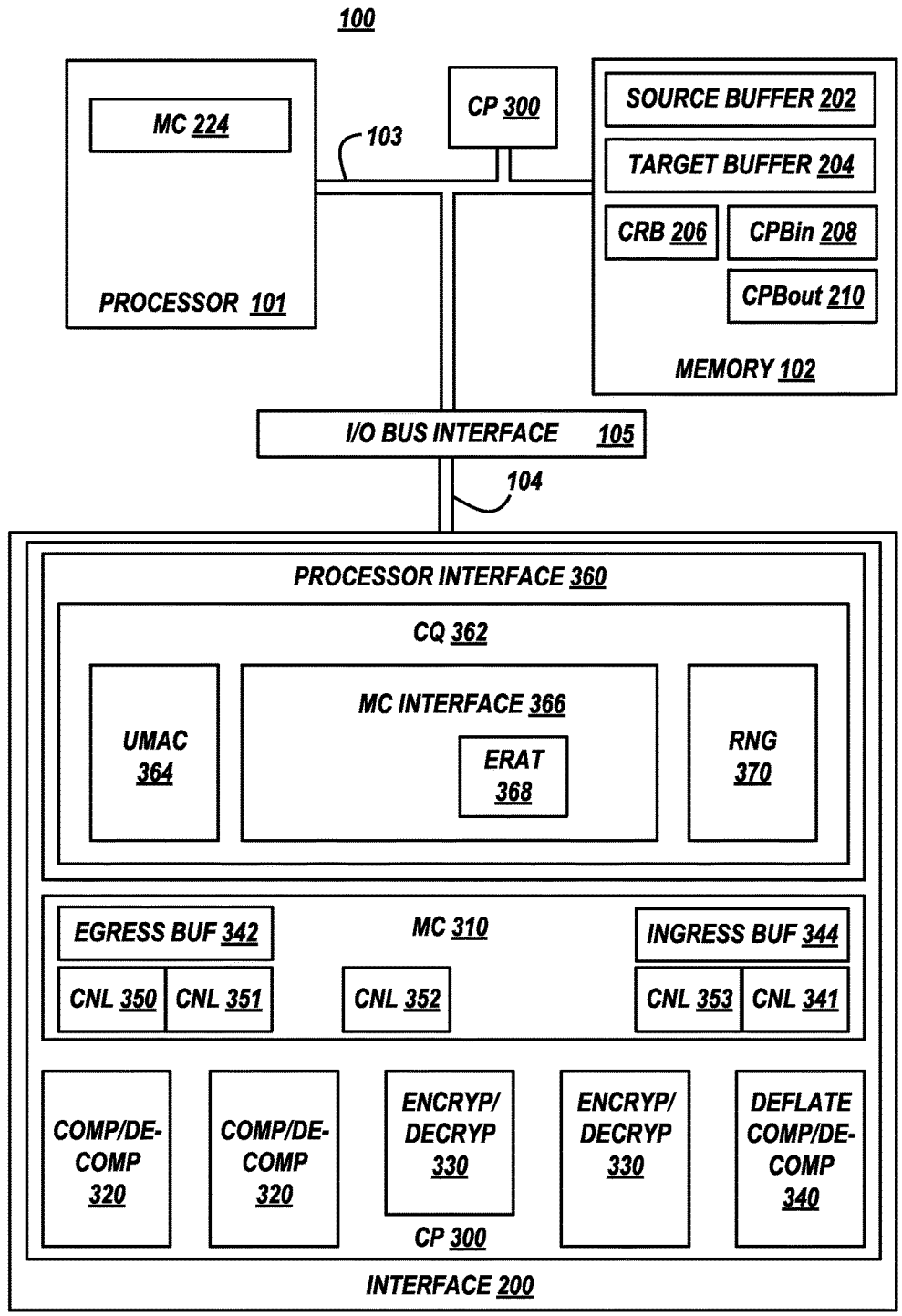
FIG. 2 illustrates a block diagram of an exemplary computer system including a processor and coprocessor for implementing various embodiments of the invention.

The I/O device interface 113 provides an interface to any of various other input/output devices or devices of other types, such as printers or fax machines. The network adapter 114 provides one or more communications paths from the computer 100 to other data handling devices such as numerous other computers; such paths may comprise, e.g., one or more networks 130. Although the memory bus 103 is shown in FIG. 2 as a relatively simple, single bus structure providing a direct communication path among the processors 101, the system memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

I/O interface 113 may contain electronic components and logic to adapt or convert data of one protocol on I/O bus 104 to another protocol on another bus. Therefore, I/O interface 113 may connect a wide variety of devices to computer 100 and to each other such as, but not limited to, tape drives, optical drives, printers, disk controllers, other bus adapters, PCI adapters, PCIe adapters, NVLink adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

Though shown as distinct entities, the multiple I/O interface units 111, 112, 113, and 114 or the functionality of the I/O interface units 111, 112, 113, and 114 may be integrated into a similar device.

In various embodiments, the computer 100 is a multi-user mainframe computer system, a single-user system, a server computer, storage system, or similar device that has little or no direct user interface, but receives requests from other computer systems (clients). In other embodiments, the computer 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer 100A and at least the computer 100B. In various embodiments, the network 130 may represent a data handling device or a combination of data handling devices, either connected directly or indirectly to the computer 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer 100. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implementing e.g. upon computer system 100 according to various embodiments of the invention may be implemented in a number of manners, including using various computer applications, routines, components, programs, objects, modules, data structures, etc.

FIG. 2 illustrates a block diagram of an exemplary computer system 100 including a processor and coprocessor for implementing various embodiments of the invention. As depicted, the computer 100 further includes a coprocessor 300 connected to processor 101 and system memory 102 via memory bus 103 or via I/O bus 104. The coprocessor 300 executes instructions stored in the system memory 102 and may comprise one or more levels local memory such as on-board cache.

The coprocessor 300 allows the processor 101 to offload the execution of instructions stored in the system memory 102 to the coprocessor allowing the processor 101 to execute other instructions stored in the system memory 102 or upon data that was previously executed by the coprocessor or upon data that will be subsequently executed by the coprocessor. For example, the coprocessor 300 may execute specific assigned instructions stored in system memory 102 to accomplish a designated task so that processor 101 need not execute those instructions, freeing up the processor 101 to accomplish other tasks. In another example, the coprocessor 300 may execute portions of instructions stored in system memory 102 and the processor 101 may execute other portions of those instructions to speed up the overall processing of that instruction set. This offloading to the coprocessor 300 generally allows for accelerated execution of particular instructions stored in the system memory 102. The coprocessor 300 may also be referred to as an accelerator, acceleration unit, or the like.

The coprocessor 300 may be located on the same system board, mother board, printed circuit board, etc. as the processor 101. For example, the coprocessor 300 may be connected to the processor 101 and system memory 102 via a system board bus, mother board bus, printed circuit board bus, such as memory bus 103. Alternatively, the coprocessor 300 may be located on an expansion card, adapter card, or the like. For example, the coprocessor 300 may be connected to the processor 101 and system memory 102 via a connector (e.g., I/O bus interface 105) connecting the system board (comprising the processor 101 and system memory 102) and the adapter card (comprising the coprocessor 300). In other words, the coprocessor 300 may be located within interface 200 which generally refers to terminal interface 111, storage interface 112, I/O device interface 113, or network interface 114.

Processor 101 may further include a data mover 224 that controls a discrete memory portion of system memory 102. If coherent computer 201 includes multiple discrete memory portions, processor 101 may include multiple data movers 224 each associated with a respective discrete memory portion of system memory 102.

Coprocessor 300 may include one or more coprocessor engines that carry out computational tasks. The term "engine" is defined herein as one or more tangible hardware devices, such as a circuit, a buffer, register, etc. that accomplish a particular coprocessor 300 function. Each coprocessor engine may comprise solely the one or more tangible hardware devices or the compressor engine may further comprise program instructions utilized, called, executed, etc. by the one or more tangible hardware device to become a particular machine configured to carry out the particular function. For example, coprocessor 300 may include one or more compression/decompression engines 320, one or more encryption/decryption engines 330, and one or more deflate compression/decompression engines 340. Note, the term "deflate" is herein utilized to refer to the compressed data format specification RFC1951, informally referred to as zip, gzip, or deflate.

Multiple clients, such as multiple applications 160, partitions, etc. may attempt to utilize each coprocessor engine simultaneously. However, each engine may accomplish the particular function for which it is designed for one client at a time. For example, a first application 160 may be utilizing deflate compression/decompression engine 340 to compress a first file. During the compression operation of the first file, a second application 160 may attempt to utilize compression/decompression engine 340 to compress a second file. It may be determined that the second file has a higher priority than the first file. Therefore, to transition from operating upon the first file to second file, the compression/decompression engine 340 may be suspended from compressing the first file so that it may begin compressing the second file. Prior to such transition, the compression/decompression engine 340 saves metadata about its operation state at the time of the suspend. At a subsequent time, the deflate compression/decompression engine 340 may resume compression operations upon the first file. To efficiently resume such operations, the operating state of the compression/decompression engine 340 is determined utilizing the metadata and compression of the first file resumes.

Coprocessor 300 may further include a data mover 310 and processor interface 360. The data mover 310 reads and writes data and status on behalf of the engines as directed by the Coprocessor Request Block (CRB) 206. The data mover 310 may include a data channel per each engine. For example, if the coprocessor 300 includes five engines, the coprocessor 300 includes channel 350 associated with data movement to and from engine 320A, channel 351 associated with data movement to and from engine 320B, channel 352 associated with data movement to and from engine 330A, channel 353 associated with data movement to and from engine 330B, and channel 354 associated with data movement to and from engine 340. The CRB 206 may include two queue positions per channel: one for currently executing on the engine and one for awaiting execution on the engine.

The processor interface 360 interfaces to bus 103 or bus 104, depending upon the location of coprocessor 300, and to data mover 310. The processor interface 360 may include a common queue 362. The common queue 360 may include a User Mode Access Control (UMAC) coprocessor invocation block 364, a data mover interface 366, and a random number generator 370.

The UMAC 364 fetches CRB 206 from in-memory work queues and dispatches them to data mover 310. The data mover interface 366 adapts the data mover 310 and RNG 370 to common queue 362. Random number generator 370 is a true random number generator.

To fetch data on behalf of an engine, the data mover 310 makes read requests for cache lines to the processor interface 360 by writing request information (address, size, and tag) in the common queue 362 in the processor interface 360. This assigns a particular read machine to handle the request. If translation is required on an address, the ERAT 368 is accessed to determine the translation exists. If the translation does not exist, a checkout request is made and a either a real address or a fault is returned. Assuming that a real address is returned, the real address is substituted for the effective address in the request. The processor interface 360 signals the data mover 310 that read data is available, passing the number of the read machine that handled the request to the data mover 310. The data mover 310 uses the machine number to access the common queue 362, retrieving the information it wrote there when making the request.

The data mover 310 uses a tag to identify the data returned and moves it to the corresponding ingress buffer 344 entry. In a sequence of data mover 310 read requests, the lines may come back in any order and the tag allows the data mover 310 to put the lines back in order in its ingress buffer 344 before forwarding it on to an appropriate engine.

Upon being signaled to start, the engine commences making requests for Coprocessor Parameter Block (CPB) data one word at a time. The engine accepts each word requested and the appropriate channel transfers each word from its ingress buffers 344 to the engine. The data transferred to the engine may be transferred in order. The channel aligns all ingress 344 data as required by the engine. Such requirements may differ from one engine type to another. The engine knows how many CPB words comprise the operation and signals to the channel when a request is the last word. After receiving all CPB, the engine makes requests for source data. The channel transfers each word of source data to the engine, accompanying each with an acknowledgement until the last word is transferred together with a "last data" indication. In embodiments, only the CPB 206 data may be needed as inputs for the engine operation. In other embodiments, input buffer 202 data as specified by one or more data descriptors present in the CPB 206 may be needed as inputs for the engine operations. The one or more data descriptors present in the CRB 206 may effectively point to other data descriptors within input buffer 202 to gather the source data for the engine operation.

To return data on behalf of an engine, the output data from the engine is written to a location in output buffer 204 as specified by one or more data descriptors within CRB 206. When an output word is available, the engine asserts an output request to the channel and the channel aligns the data within cache lines according to the starting address of the destination. The channel transfers the word to an egress buffer 342 from where it is transferred to write buffers in the common queue 362. When a line of data has been written into the common queue 362, the channel signals to the processor interface 360 that a line is available to be written to storage, provides an address for the data to the ERAT 368, and selects a free data mover 310 write machine to perform the write. If translation is required on an address, the ERAT 368 is accessed to determine the translation exists. If the translation does not exist, a checkout request is made and either a real address or a fault is returned. Assuming that an RA is returned, the real address is substituted for the effective address in the request. The processor interface 360 enqueues the request in common queue 362 and the data mover 310 write machine then performs the bus tasks necessary to properly store the line. This process continues until the engine has indicated that the last word of target data has been transferred.

In particular embodiments, system memory 102 may further include Input Coprocessor Parameter Block (CPBin) 208 and Output Coprocessor Parameter Block (CPBout) 210. CPBin 208 and CPBout 210 may be, for instance, utilized when the engine operations are suspended and resumed. For example, engine state metadata is written to CPBout 210 for restoring the engine state when resuming the compression job.

Figure 3:
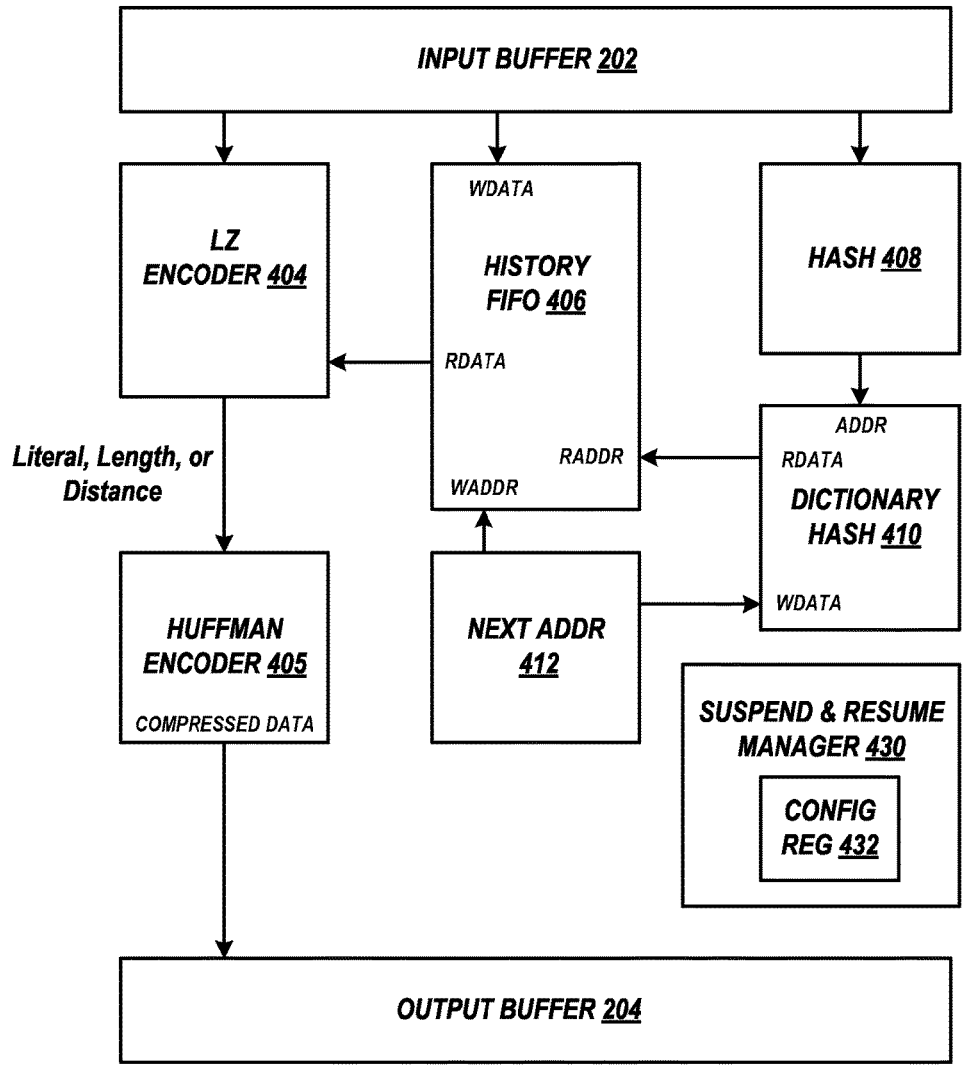
FIG. 3 illustrates a block diagram of an exemplary compression system within a coprocessor.

FIG. 3 illustrates a block diagram of an exemplary compression system 400 within coprocessor 300. More particularly, exemplary compression system 400 may be located within deflate compression decompression engine 340. Compression system 400 may include the input buffer 202, output buffer 204, LZ encoder 404, Huffman decoder 405, History FIFO 406, Hash Device 408, Hash Dictionary 410, and Next Address Counter 412. History FIFO 406 and Hash Dictionary 410, also referred to as a Hash Table, are located within the local memory of coprocessor 300. For example, History FIFO 406 and Hash Dictionary 410 are located within coprocessor 300 static random-access memory (SRAM), cache, etc.

The LZ encoder 404, Huffman decoder 405, History FIFO 406, Hash Device 408, Hash Dictionary 410, and Next Address Counter 412 are generally known hardware elements within deflate compression and decompression systems, such as a zip compression and decompression system. As depicted, compression system 400 may further include a suspend and resume manager 430 to control the suspend and resumption of the compression system 400. Suspend and resume manager 430 includes a tangible portion(s) of coprocessor 300 (e.g., circuits, registers, storage, etc.) along with program instructions utilized, called, executed, etc. by those portion(s) of coprocessor 300 to become a particular machine configured to carry out functions of the program instructions. The suspend and resume manager 430 generally arbitrates competing client access to particular coprocessor 300 engines. Suspend and resume manager 430 may allow or not allow access to particular engines of the coprocessor by e.g., stopping data flow into a particular engine, determining that data flow into a particular engine has ceased and the engine should be transferred to another client, etc. When suspend and resume manager 430 determines that access to a first client should cease it generally suspends engine operations associated with the first client so that the engine operations may be utilized by a second client. When suspend and resume manager 430 determines that access to the first client should be again allowed after the suspend it generally resumes engine operations associated with the first client so that the engine operations may given back to the first client.

The History FIFO 406 may be associated with compression and/or decompression functions. For example, a single history FIFO 406 may be utilized by both compression and decompression operations. Alternatively, a first history FIFO 406 may be utilized by compression operations and a second history FIFO 406 may be utilized by decompression operations.

In some embodiments, suspend and resume manager 430 is located within processor 101 and therefore includes a tangible portion(s) of processor 101 (e.g., circuits, registers, storage, etc.) along with program instructions utilized, called, executed, etc. by those portion(s) of processor 101 to become a particular machine configured to carry out functions of the program instructions. In other embodiments, first portions of suspend and resume manager 430 may be located within coprocessor 300 and second portions of suspend and resume manager 430 may be located within processor 101.

In an exemplary compression operation, a new input word arrives from input buffer 202. A copy of the raw (i.e., non-compressed) most recent input words within the FIFO buffer 406 are retained in the input buffer 202. The new input word is written to the history FIFO buffer 406 at a sequential FIFO address, written to LZ encoder 404, and written to hash device 408 to obtain a hash address. Counter 412 writes the assigned FIFO address to a Hash Dictionary 410 entry, which is also referred to as a Hash Table. Counter 412 may then be incremented to determine a next sequential FIFO address to prepare for a subsequent input word.

A hash value at the hash address is read from the Hash Dictionary 410. The hash value is used as a FIFO address and an associated phrase is read from the history FIFO buffer 406 by LZ encoder 404. The LZ encoder 404 compares the associated phrase read from the history FIFO buffer 406 to the new input word. If the phrase read from the history FIFO buffer 406 and the new input word are equal, the LZ outputs the distance from the new input word to the phrase read from the history FIFO buffer 406 to form a pointer that replaces duplicate phrases. The output from the LZ encoder 404 may be further compressed by Huffman Encoder 405 as is known in the art. The compressed output from the encoder is written to output buffer 204.

The compression system 400 does not require all data to be present in input buffer 202 before a compress begins. Source data may become available piecemeal, for example, when reading as small chunks from storage device 125 or network 130, because the source buffer 202 is not big enough to contain an entire input. The suspend & resume manager 430 generally manages the starting and stopping of execution of the compression system 400. For example, when the source buffer 202 is depleted, the suspend & resume manager 430 suspends execution and writes metadata about the internal state of compression system 400 to CPBout 210. When the suspend & resume manager 430 resumes the execution of the compression system 400, operations resume from where there were suspended by reading the state metadata from CPBin 208.

Compression system 400 may also be suspended when it reaches a system determined job length limit. For example, a job length limit may be specified in configuration register 432 and utilized for fair scheduling of multiple compression jobs from competing users and for high priority jobs to preempt low priority jobs. For example, an interrupt handler software routine needing engine 340 may preempt a user mode application 160 running a long compression operation.

Suspend & resume manager 430 suspends compression system 400 by stopping new input data words from streaming into compression system 400 from input buffer 202. When compression system 400 is suspended, the bulk of the state of the compression system 400 is contained in history FIFO buffer 406 and the Hash Table. To reduce the amount of data saved to system memory 102 when saving the state of compression system 400 upon suspend, metadata describing the state of compression system 400 is saved to CPBout 210, as opposed to the entire contents of the history FIFO buffer 406. At the time of resuming compression system 400, suspend & resume manager 430 utilizes the metadata to recreate the history FIFO buffer 406 and the Hash Table so that compression operations may be resumed from where there were suspended.

Upon the suspend, suspend & resume manager 430 clears the contents of history FIFO buffer 406 and saves a Target Empty Bit Count (TEBC) to CPBout 210. TEBC is the metadata describing the state of compression system 400 upon suspend and identifies the quantity of padding bits in the most recent byte of the compression system 400 output. Padding bits are added to new input words to make the new input words a length equal to that stored within history FIFO buffer 406. In other words, padding bits are filler bits. When compression operations resume, the TEBC value is read by the client associated with the previous suspend to align newly compressed output from the compression system 400 to the most recent byte of the compression system 400 output prior to the suspend.

Suspend & resume manager 430 resumes compression system 400 by restoring the contents of history FIFO buffer 406 and the Hash Table. To restore the contents of the history FIFO buffer 406 the copy of the most recent input words that were previously within the history FIFO buffer 406 are read from the input buffer 202. For example, an input buffer 202 pointer may be rewound by the size of the history FIFO buffer 406 and the data identified by the rewound pointer may be read from input buffer 202 into history FIFO buffer 406. The Hash Table is restored by recomputing hash device 408 hash functions and rewriting the Hash Table as is generally known in the art. During the restoration of the history FIFO buffer 406 and the Hash Table, no compressed output is processed by compression system 400 as the internal history of the compression system 400 is being restored to arrive at the similar state at the time of suspend. The TEBC value is read from CPBin 208 and newly compressed output from the compression system 400 is aligned to the most recent byte of the compression system 400 output prior to the suspend and the compression system 400 suspend.

The previous and new compressed output may be aligned by the client (i.e. the client associated with the previous suspend) reading the TEBC value to determine that the last byte of output had the specified quantity of filler bits. The associated client can align the previous and new compressed output by various techniques. First, the associated client may add a number of padding bits to the new compressed output to align the new output to the previous byte's boundary. Padding bits may be byte aligning control characters as defined by the deflate method. In another technique, the associated client may shift the new output by the TEBC value to overwrite the previous output's padding bits.

Figure 4:
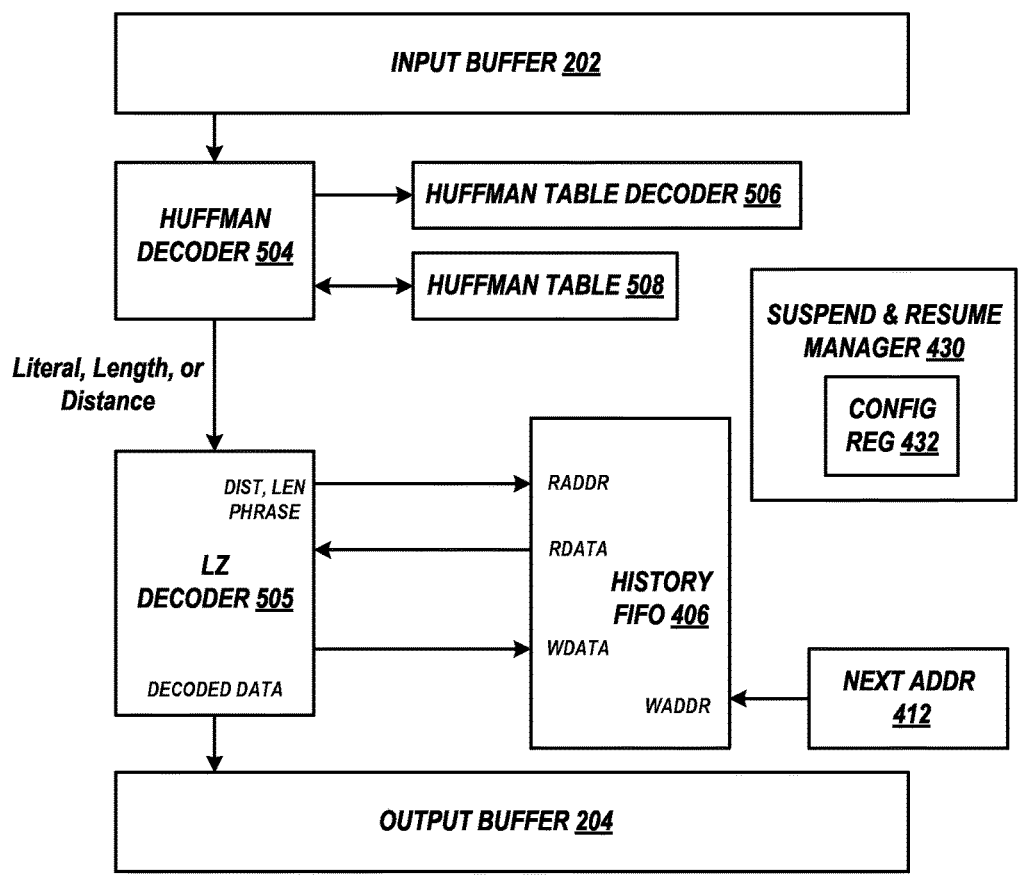
FIG. 4 illustrates a block diagram of an exemplary decompression system within a coprocessor.

FIG. 4 illustrates a block diagram of an exemplary decompression system 500 within a coprocessor. More particularly, exemplary decompression system 500 may be located within deflate compression decompression engine 340. Decompression system 500 may include the input buffer 202, output buffer 204, Huffman decoder 504, LZ decoder 505, History FIFO 406, Huffman Table Decoder 506, Huffman Table 508, and Next Address Counter 412. History FIFO 406 and Huffman Table 508 are located within the local memory of coprocessor 300. For example, History FIFO 406 and Huffman Table 508 are located within coprocessor 300 SRAM, cache, etc.

Huffman decoder 504, LZ decoder 505, History FIFO 406, Huffman Table Decoder 506, Huffman Table 508, and Next Address Counter 412 are generally known hardware elements within deflate compression and decompression systems. As depicted, decompression system 500 may further include a suspend and resume manager 430 to control the suspend and resumption of the decompression system 500. Suspend and resume manager 430 may comprise program instructions utilized, called, executed, etc. by the coprocessor 300 to become a particular machine configured to carry out functions of the program instructions.

In an exemplary decompression operation, compressed data arrives from input buffer 202. The compressed data contains a dynamic Huffman Table 508 and the table 508 is decoded and stored in the local memory of coprocessor 300. The compressed data is decoded by the Huffman Decoder 504 and the LZ decoder 505 sequentially, as is known in the art. If a LZ coded sequence contains a pointer, such as a Length-Distance, pair, the associated stored phrase is read from History FIFO 406. LZ literal phrases and LZ decoded phrases are assembled to reconstitute the uncompressed raw data which is written to the output buffer 204 and to the History FIFO 406.

Suspend may be restored by the associated client (i.e., the client associated with cution of the decompression system 500. For example, when the source buffer 202 is depleted, the suspend & resume manager 430 suspends execution and writes metadata about the internal state of decompression system 500 to CPBout 210. When suspend & resume manager 430 resumes the execution of the decompression system 500, operations resume from where there were suspended by reading the state metadata from CPBin 208.

Suspend & resume manager 430 suspends decompression system 500 by stopping new compressed data words from streaming into decompression system 500 from input buffer 202. When decompression system 500 is suspended, the bulk of the state of the decompression system 500 is contained in history FIFO buffer 406 and the Huffman Table 508. To reduce the amount of data saved to system memory 102 when saving the state of decompression system 500 upon suspend, metadata describing the state of decompression system 500 is saved to CPBout 210, as opposed to the entire contents of the history FIFO buffer 406 and Huffman Table 508. At the time of resuming decompression system 500, suspend & resume manager 430 utilizes the metadata to recreate the history FIFO buffer 406 and the Huffman Table 508 so that decompression operations may be resumed from where there were suspended.

Upon suspend, suspend & resume manager 430 clears the contents of history FIFO buffer 406 and the Huffman Table 508 and writes the Huffman Table 508 stored within the local memory of coprocessor 300 and the length of the Huffman Table 508 to CPBout 210, writes a source unprocessed bit count (SUBC) to CPBout 210, and writes a source final block type (SFBT) to CPBout 210.

As suspend & resume manager 430 may suspend a decompression operations at any point in the decompression operation, suspend & resume manager 430 may continuously checkpoint the compressed input data stream from input buffer 202 at predetermined intervals. The SUBC value indicates the location of the most recent checkpoint relative to the current location at which the decompress operation is suspended. In other words, the SUBC value indicates the amount of compressed source data ingested by the coprocessor 300 but was not decompressed. If for example, the source data is cut short in the middle of the Huffman decode, the SUBC value indicates how many bits of compressed source data must be resubmitted upon resuming.

Suspend & resume manager 430 also writes to CPBout 210, the type of block that was being decoded when the suspend occurred as the SFBT value. As is known in the art, decompression operations may decompress three different types of blocks: type 0, type 1, or type 2. As such, the SFBT value identifies the type of block was being decoded when the suspend occurred as a type 0, type 1, or type 2 block.

Suspend & resume manager 430 resumes decompression system 500 by restoring the contents of history FIFO buffer 406 and the Huffman Table 508. The Huffman Table 508 is restored by reading the Huffman Table 508 copy from system memory 102, decoding the read Huffman Table 508 with Huffman table decoder 506, if needed, and storing the recreated decoded Huffman Table 508 in the local memory of coprocessor 300.

To restore the input bits which the coprocessor 300 had dropped prior to suspend, the client associated with the prior suspend rewinds the input buffer pointer by the SUBC amount and writes the associated data into the appropriate decompression component (e.g., Huffman decoder 504, LZ decoder 505, etc.) so that coprocessor 300 may operate upon those previously dropped bits. On the output side of the coprocessor 300 decompression operations, the previously decompressed contents of the history FIFO buffer 406 that were dropped in association with the suspend may be restored by the associated client (i.e., the client associated with the previous suspend) by reading/writing up to the history-FIFO-maximum number of bytes from the output buffer 204 to history the FIFO 406.

The contents of the history FIFO buffer 406 may be restored by the associated client (i.e., the client associated with the previous suspend) according to the SUBC value and the history FIFO 406 contents are recreated by reading up to the history-FIFO-maximum number of bytes from input buffer 202 and writing them to history FIFO 406.

Figure 5:
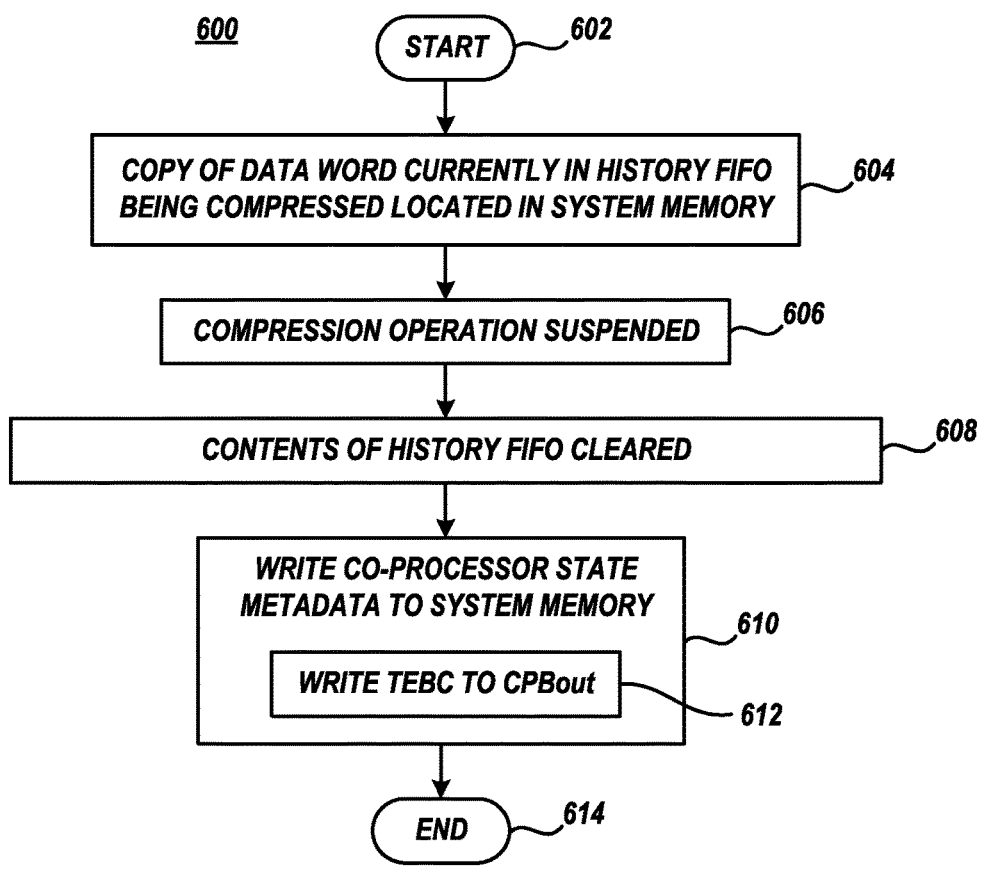
FIG. 5 illustrates an exemplary method of suspending compression functions in a coprocessor, according to various embodiments of the present invention.

FIG. 5 illustrates an exemplary method 600 of suspending compression functions in coprocessor 300, according to various embodiments of the present invention. Method 600 may be utilized, for example, by computer 100, processor 101, coprocessor 300, suspend & resume manager 430, or other computing device, or a combination of such devices, to manage or control the suspend of a compression function being executed upon coprocessor 300. The suspend may be apart of a coprocessor 300 arbitration scheme so that compression functions may be delivered to numerous clients (i.e. different applications 160, different users, different partitions, etc.) in a time shared manner. For example, a first application 160 may be utilizing deflate compression/decompression engine 340 to compress a first file. During the compression operation of the first file, a second application 160 may attempt to utilize compression/decompression engine 340 to compress a second file. The suspend & resume manager 430 may determine that the second file has a higher priority than the first file. Therefore, to transition from operating upon the first file to second file, the suspend & resume manager 430 suspends compression/decompression engine 340 from compressing the first file so that it may begin compressing the second file.

Prior to such transition, the compression/decompression engine 340 saves metadata about its operation state at the time of the suspend. At a subsequent time, the compression/decompression engine 340 may resume compression operations upon the first file. To efficiently resume such operations, the operating state of the compression/decompression engine 340 is determined utilizing the metadata and compression of the first file resumes.

Method 600 begins at block 602 and continues by retaining a copy of the streaming data currently in history FIFO 406 within system memory 102. For example as data streams into history FIFO 406 from input buffer 202 a copy of the data is retained in system memory (i.e. within input buffer 202, another location of system memory 102, etc.). As the data is compressed and delivered to output buffer 204 and new data enters the history FIFO 406 the retained copy of the data within system memory 102 is updated. In other words, the content of the history FIFO 406 mirrors the retained data copy within system memory 102.

Method 600 may continue by suspending the compression operation (block 606). For example, incoming streaming data into history FIFO 406 stops. The suspend of the incoming data may be stopped by e.g. suspend & resume manager 430 by monitoring configuration register 432 to determine whether a predetermined job length limit threshold is exceeded in order to arbitrate the compression function between competing clients. Alternatively, the suspend operation may be suspended when the source buffer 202 is depleted of incoming data.

Method 600 may continue by clearing the contents of the history FIFO (block 608). For example, the suspend & resume manager 430 may delete, drop, forget, rewrite, indicate as insignificant, destroy, or otherwise dispose of the contents of the history FIFO 406.

Method 600 may continue by writing metadata describing the internal state of coprocessor 300 to system memory 102. For example, the suspend & resume manager 430 writes metadata describing the contents of the history FIFO 406 that were cleared or are to be cleared to CPBout 210. When compression operations resume the compression operations are able to resume from where there were suspended by reading this metadata. In a particular embodiment, the metadata is a TEBC value written to CPBout 210 (block 612). TEBC indicates the number of padding bits in the most recent byte of the compressed output delivered to output buffer 204. Padding bits may have been added to new input data to make the new input a length equal to that stored within history FIFO buffer 406. When compression operations resume, the TEBC value is read in order to align newly compressed output of the coprocessor 300 to the previous output the coprocessor 300 prior to the suspend. Method 600 ends at block 614.

Figure 6:
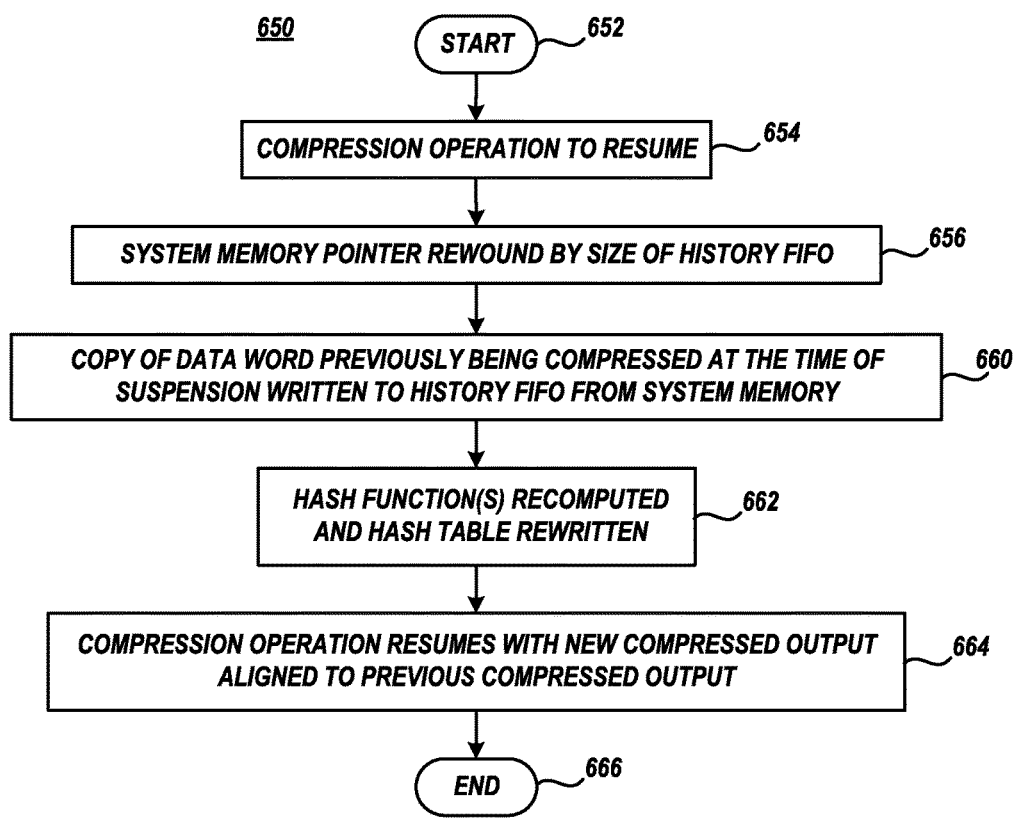
FIG. 6 illustrates an exemplary method of resuming compression functions in a coprocessor, according to various embodiments of the present invention.

FIG. 6 illustrates an exemplary method 650 of resuming compression functions in coprocessor 300, according to various embodiments of the present invention. Method 650 may be utilized, for example, by computer 100, processor 101, coprocessor 300, suspend & resume manager 430, or other computing device, or a combination of such devices, to manage or control resuming of the compression function previously suspended upon coprocessor 300. The resumption may be apart of a coprocessor 300 arbitration scheme so that compression functions may be delivered to a previously suspended client.

Method 650 begins at block 652 and may continue with determining that compression operation that was previously suspended should resume (block 654). For example, suspend & resume manager 430 determines that operations should be given back to the application 160 associated with the suspend and resumes the compression operation by restoring the contents of history FIFO buffer 406 and the Hash Table referencing the metadata previously saved to system memory 102.

Method 650 may continue by rewinding a system memory 102 pointer by a length equivalent to the size of the history FIFO buffer 406 (block 656). Method 650 may continue by restore the contents of the history FIFO buffer 406 by loading the data identified by the rewound system memory 102 pointer into the history FIFO buffer 406 (block 660). In this way, the contents of the history FIFO buffer 406 at the time of compression operation suspend are loaded back to the history FIFO buffer 406 from system memory 102.

Method 650 may continue by recomputing Hash Functions of the Hash Device 408 and rewriting the Hash Dictionary 410 (block 662). Techniques to recompute the hash device 408 hash functions and rewrite the Hash Dictionary 410 are generally known in the art.

Method 650 may continue by resuming the compression function with newly compressed output aligned with compressed output prior to the compression operation being suspended (block 664). For example, the TEBC value may be read from CPBin 208 and newly compressed output from the compression system 400 is aligned to the most recent byte of the compression system 400 output prior to the suspend and the compression system 400 suspend. The previous and new compressed output may be aligned by the associated client (i.e. the client that requested operations of the previous suspend) reading the TEBC value to determine that the last byte of output had the specified quantity of filler bits. The associated client can align the previous and new compressed output by two techniques. First, the associated client may append a number of padding bits to the new compressed output to align the new output to the previous byte's boundary. In another technique, the associated client may shift the new output by the TEBC value to overwrite the previous output's filler bits. Method 650 ends at block 666.

Figure 7:
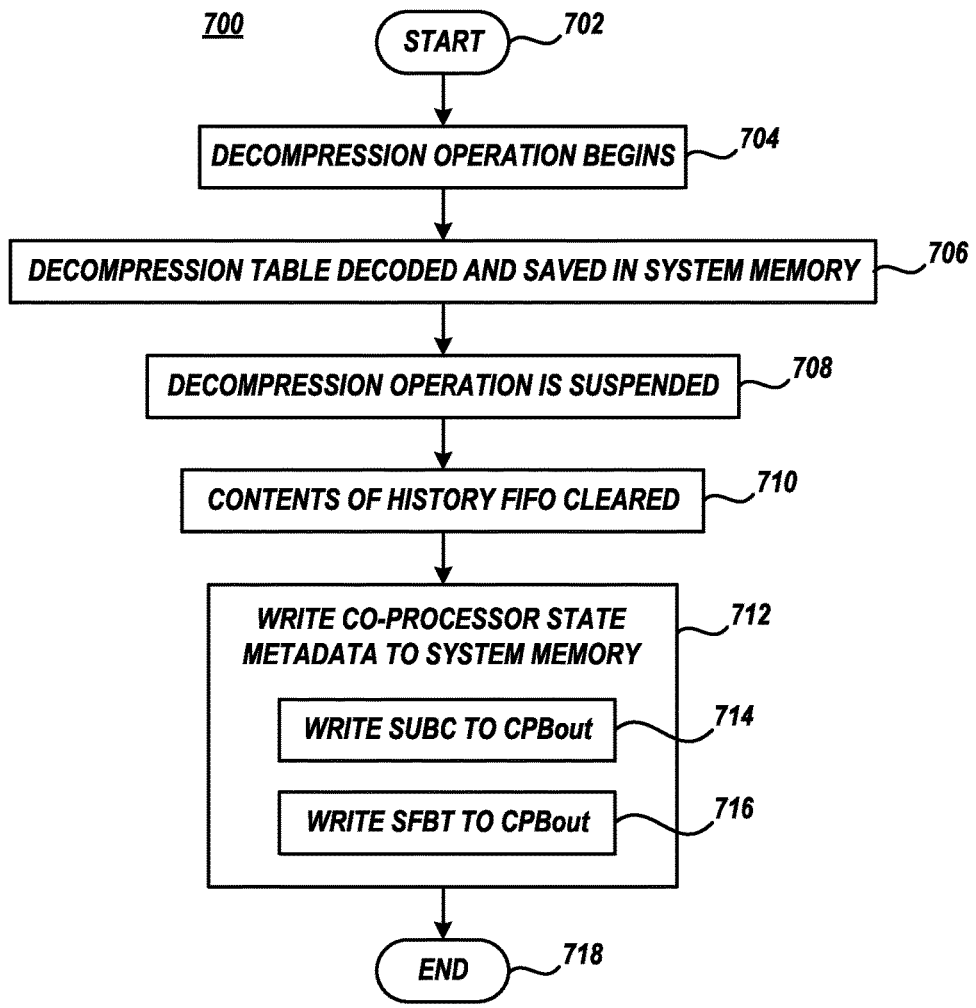
FIG. 7 illustrates an exemplary method of suspending decompression functions in a coprocessor, according to various embodiments of the present invention.

FIG. 7 illustrates an exemplary method 700 of suspending decompression functions in coprocessor 300, according to various embodiments of the present invention. Method 700 may be utilized, for example, by computer 100, processor 101, coprocessor 300, suspend & resume manager 430, or other computing device, or a combination of such devices, to manage or control the suspend of a decompression function being executed upon coprocessor 300. The suspend may be apart of a coprocessor 300 arbitration scheme so that decompression functions may be delivered to numerous clients (i.e. different applications 160, different users, different partitions, etc.) in a time shared manner. For example, a first application 160 may be utilizing deflate compression/decompression engine 340 to decompress a first file. During the decompression operation of the first file, a second application 160 may attempt to utilize compression/decompression engine 340 to decompress a second file. The suspend & resume manager 430 may determine that the second file has a higher priority than the first file. Therefore, to transition from operating upon the first file to second file, the suspend & resume manager 430 suspends compression/decompression engine 340 from decompressing the first file so that it may begin decompressing the second file. Prior to such transition, the compression/decompression engine 340 saves metadata about its operation state at the time of the suspend. At a subsequent time, the compression/decompression engine 340 may resume decompression operations upon the first file. To efficiently resume such operations, the operating state of the compression/decompression engine 340 is determined utilizing the metadata and decompression of the first file resumes.

Method 700 begins at block 702 and continues by decompression operations beginning (block 704). For example, compressed data streams from input buffer 202 to be decompressed. Method 700 may continue with the decompression table associated, embedded, etc. with the compressed data input being decoded and saved in system memory 102 (block 706). For example, the Huffman Table 508 is decoded and saved in the local memory of coprocessor 300 to be utilized in decompression operations. The Huffman Table 508 is also decoded and saved in system memory 102 so that it may be recalled, decoded, and/or utilized when decompression function is resumed.

Method 700 may continue by suspending decompression operations (block 708). In other words, the incoming compressed streaming data stops. The suspend of the compressed incoming data may be stopped by e.g. suspend & resume manager 430 by monitoring configuration register 432 to determine whether a predetermined job length limit threshold is exceeded in order to arbitrate the decompression function between competing clients. Alternatively, the suspend operation may be suspended when the source buffer 202 is depleted of incoming compressed data.

Method 700 may continue by clearing the contents of the history FIFO 406 (block 710). For example, the suspend & resume manager 430 may delete, drop, forget, rewrite, indicate as insignificant, destroy, or otherwise dispose of the contents of the history FIFO 406.

Method 700 may continue by writing metadata describing the internal state of coprocessor 300 to system memory 102 (block 712). For example, the suspend & resume manager 430 writes metadata describing the contents of the history FIFO 406 to CPBout 210. When decompression operations resume the decompression operations are able to resume from where there were suspended by utilizing metadata to align the new output to the previous output.

In a particular embodiment, the metadata is a SUBC value written to CPBout 210 (block 714) and/or a SFBT value written to CPBout 210. As suspend & resume manager 430 may suspend a decompression operations at any point in the decompression operation, suspend & resume manager 430 may continuously checkpoint the compressed input data stream from input buffer 202 at predetermined intervals, lengths, etc. The SUBC value indicates the location of the most recent checkpoint relative to the current location at which the decompress operation is suspended. In other words, the SUBC value indicates the amount of compressed source data ingested by coprocessor 300 but was not decompressed. If for example, the source data is cut short in the middle of the Huffman Table 508 decode, the SUBC value indicates how many bits of compressed source data must be resubmitted. The suspend & resume manager 430 can calculate the resume address by subtracting the SPBC from the location of the most recent checkpoint.

Suspend & resume manager 430 may also write the SFBT value to CPBout 210 (block 716). The SFBT indicates the type of block that was being decoded when the decompression suspend occurred. The SFBT value generally identifies the type of block was being decoded when the suspend occurred as a type 0, type 1, or type 2 block. Method 700 ends at block 718.

Figure 8:
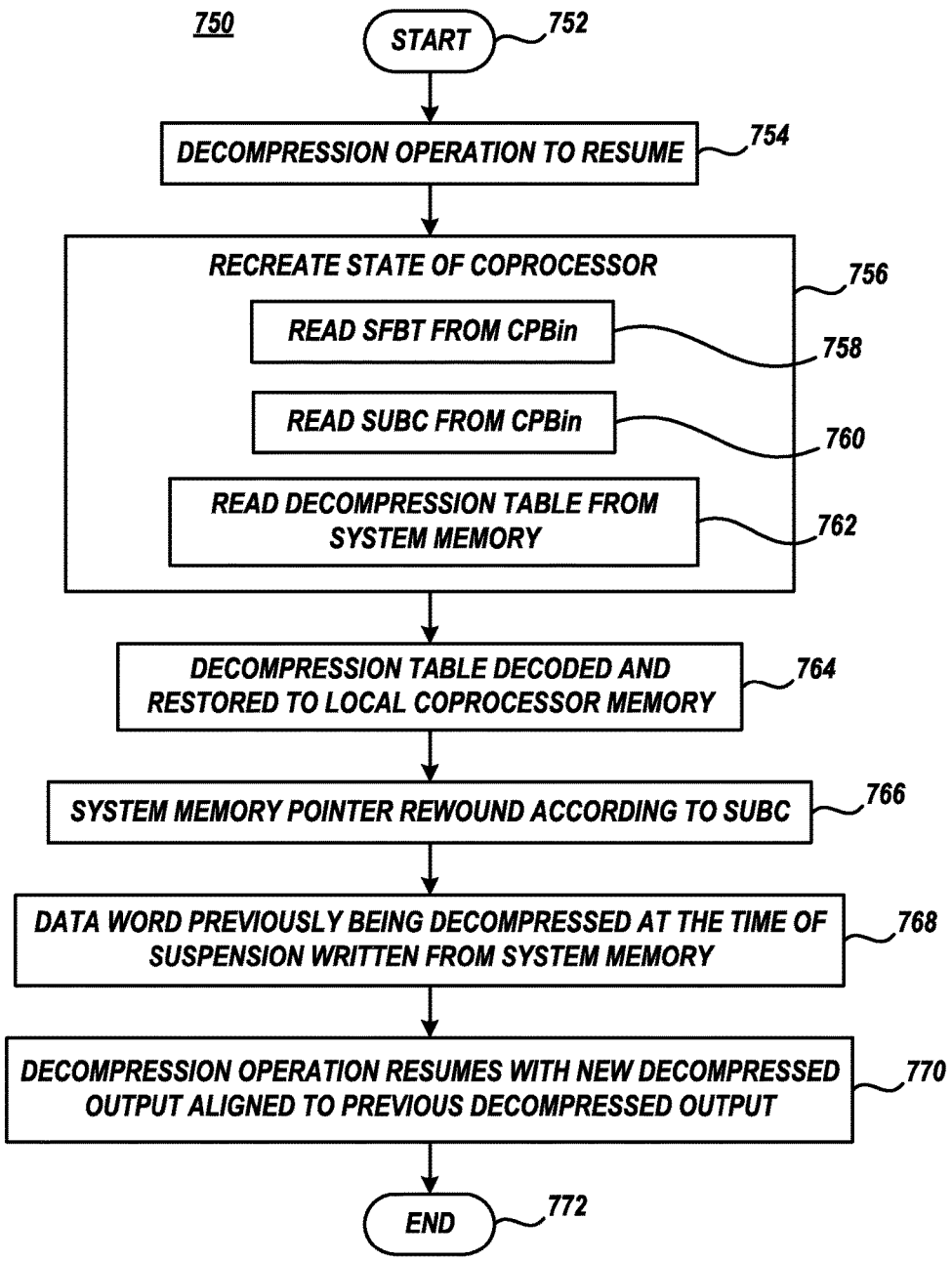
FIG. 8 illustrates an exemplary method of resuming decompression functions in a coprocessor, according to various embodiments of the present invention.

FIG. 8 illustrates an exemplary method 750 of resuming decompression functions in coprocessor 300, according to various embodiments of the present invention. Method 750 may be utilized, for example, by computer 100, processor 101, coprocessor 300, suspend & resume manager 430, or other computing device, or a combination of such devices, to manage or control resuming of the decompression function previously suspended upon coprocessor 300. The resumption may be apart of a coprocessor 300 arbitration scheme so that decompression functions may be delivered to a previously suspended client.

Method 750 begins at block 752 and continues when determining that decompression function shall resume (block 754). For example, suspend & resume manager 430 may determine that the decompression function of the coprocessor 300 is not currently utilized and that a previously suspended decompression operation should be resumed.

Method 750 may continue by recreating the state of the coprocessor 300 (block 756). For example, suspend & resume manager 430 determines the type of block that was being operated upon at the time of the suspend by reading the SFBT value from CPBin 208 (block 758), determines the amount of compressed data previously ingested by coprocessor 300 but was not decompressed by reading the SUBC value from CPBin 208 (block 760), and reads the copy of the Huffman Table 508 associated with the previously ingested by coprocessor 300 from system memory 102 (block 762).

Method 750 may continue by restoring the decompression table and saving the decompression table to the local memory of coprocessor 300. For example, suspend & resume manager 430 may restore the Huffman Table 508 by reading the Huffman Table 508 copy from system memory 102, decoding the read Huffman Table 508 with Huffman table decoder 506, if needed, and storing the decoded Huffman Table 508 in the local memory of coprocessor 300.

Method 750 may continue by rewinding the system memory 102 pointer by a quantity specified by the SUBC value (block 766). For example, the client associated with the previous suspend rewinds the input buffer 202 pointer according to the SUBC value to point to the compressed data word within input buffer 202 that was previously ingested by coprocessor 300 but was not decompressed. Method 750 may continue by reading the compressed data as indicated by the system memory pointer into the appropriate decompression component, such as the Huffman decoder 504, LZ decoder 505, etc. (block 768). For example, the client associated with the previous suspend loads the compressed data that was previously ingested by coprocessor 300 but was not decompressed from input buffer 202 by calling the data word identified by the pointer from input buffer 202. The compressed data word that was located within history FIFO 406 and dropped at the previous suspend, may be written back to history FIFO 406 by writing up to the size of history FIFO 406 of the most recent decompressed data from output buffer 204 that were associated with the operations immediately preceding the suspend.

Method 750 may continue by resuming data decompression operations with the new decompressed output aligned to the previous decompressed output (block 770). For example, the client associated with the previous suspend aligns the new decompressed output with the previous decompressed output by connecting, making congruent, making contiguous or otherwise associating to the new decompressed output with the previous decompressed output. Method 750 ends at block 772.

Figure 9:
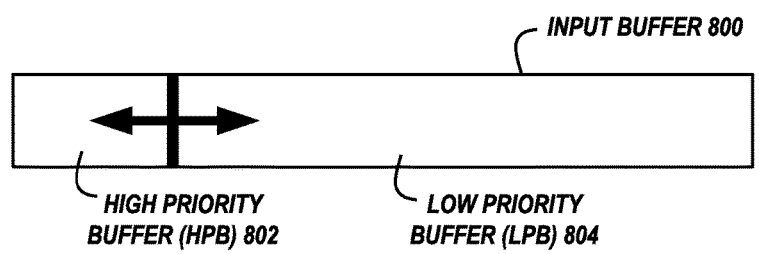
FIG. 9 illustrates an exemplary input buffer utilized in compression and/or decompression functions within a coprocessor, according to various embodiments of the present invention.

FIG. 9 illustrates an exemplary input buffer 800 utilized in compression and/or decompression functions within coprocessor 300, according to various embodiments of the present invention. Generally, input buffer 800 may be a compression input buffer that may be accessed by coprocessor 300 to compress data or a decompression input buffer that may be accessed by coprocessor 300 to decompress data. Input buffer 800 includes a high priority buffer (HPB) portion 802 and a low priority buffer (LPB) portion 804. In embodiments, the HPB 802 is shorter, smaller, etc. relative to the LPB 804. HPB 802 is utilized by applications 160 calling coprocessor 300 having short deadlines. For example, HPB 802 is utilized by an interrupt handler application 160. In such embodiments, LPB 804 is utilized by applications 160 that can operate in a batch mode, where completion time is not critical.

In an embodiment, to increase overall system performance, the suspend and subsequent resumption of operations of a coprocessor 300 should be minimized as the processes to save or recall the state metadata of the coprocessor 300 take computational time away from actual coprocessor 300 (e.g., compression, decompression, etc.) operations.

To limit the instances of suspending and resuming of operations of coprocessor 300, a configuration register 432 may be utilized by the suspend and resume manager 430. The configuration register 432 is generally located within the local memory of coprocessor 300 and is a specific location whereby a suspend threshold value may be set. The suspend threshold value may be set to a high value or a low value depending upon the existence of applications 160 utilizing the HPB 802 and or the LPB 804 For example, a low suspend threshold value may be set if the HBP 802 includes data to be operated upon by the coprocessor 300. A low suspend threshold value generally allows for more frequent suspend of operations of coprocessor 300. A high suspend threshold value generally allows for less frequent suspend of operations of coprocessor 300, relative to the low suspend threshold value.

Figure 10:
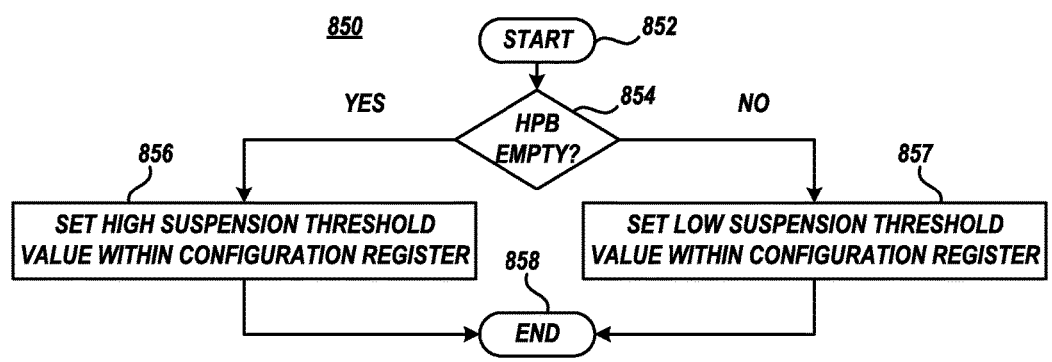
FIG. 10 illustrates an exemplary method of setting a suspend threshold value used to efficiently suspend compression or decompression functions of a coprocessor, according to various embodiments of the present invention.

FIG. 10 illustrates an exemplary method 850 of setting a suspend threshold value used to efficiently suspend coprocessor functions, according to various embodiments of the present invention. Method 850 may be utilized, for example, by computer 100, coprocessor 300, suspend & resume manager 430, or other computing device, or a combination of such devices, to set a high or low suspend threshold value. The setting of the suspend threshold value may be apart of a coprocessor 300 arbitration scheme so that coprocessor 300 function may be efficiently suspended in association with a first client so that the function may be offered or delivered to a second client.

Method 850 starts at block 852 and continues with determining if the HPB 802 is empty (block 854). If the HPB 802 is empty no high priority applications 160 are requesting the utilization of coprocessor 300. If the HBP 802 is not empty at least one high priority applications 160 are requesting the utilization of coprocessor 300. If the HPB 802 is empty, a high suspend threshold value is set within configuration register 432 (block 856). If the HPB 802 is not empty, a low suspend threshold value is set within configuration register 432 (block 857). Therefore, for example, if HPB 802 is empty, it is relatively more difficult for suspend & resume manager 430 to suspend operations of the coprocessor 300 so that function of the coprocessor 300 may be given to a competing client. Method 850 ends at block 858.

Figure 11:
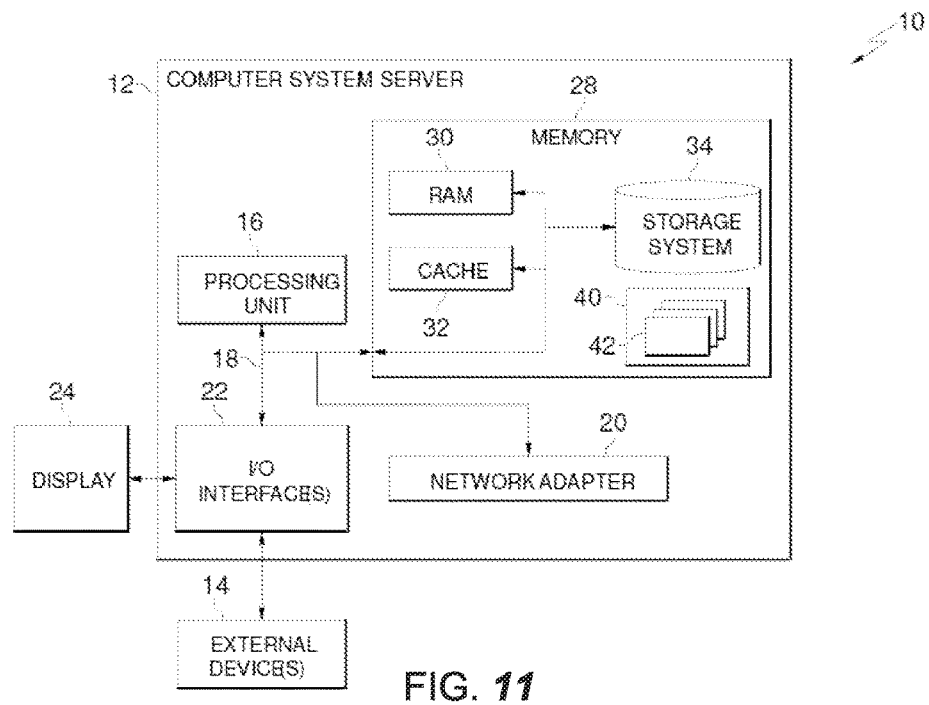
FIG. 11 depicts a cloud computing node according to an embodiment of the present invention.

FIG. 11 illustrates an exemplary method 870 of setting a suspend threshold value used to efficiently suspend coprocessor 300 functions, according to various embodiments of the present invention. Method 870 may be utilized, for example, by computer 100, coprocessor 300, suspend & resume manager 430, or other computing device, or a combination of such devices, to set a high or low suspend threshold value. The setting of the suspend threshold value may be apart of a coprocessor 300 arbitration scheme so that coprocessor 300 function may be efficiently suspended in association with a first client so that the function may be offered or delivered to a second client.

Embodiments of the present invention may be a system, a method, and/or a computer program product. The computer program product may include a computer readable storage medium (or media) having computer readable program instructions thereon for causing a processor to carry out aspects of the present invention. The computer readable storage medium is a tangible device that can retain and store instructions for use by an instruction execution device. The computer readable storage medium may be, for example, but is not limited to, an electronic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or data mover, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
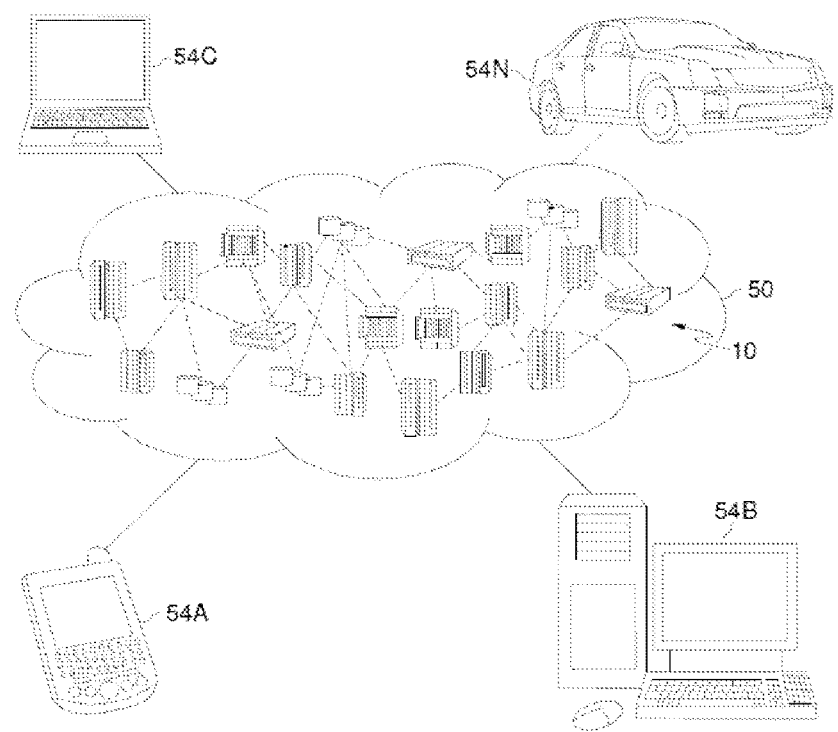
FIG. 12 depicts a cloud computing environment according to an embodiment of the present invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 13:
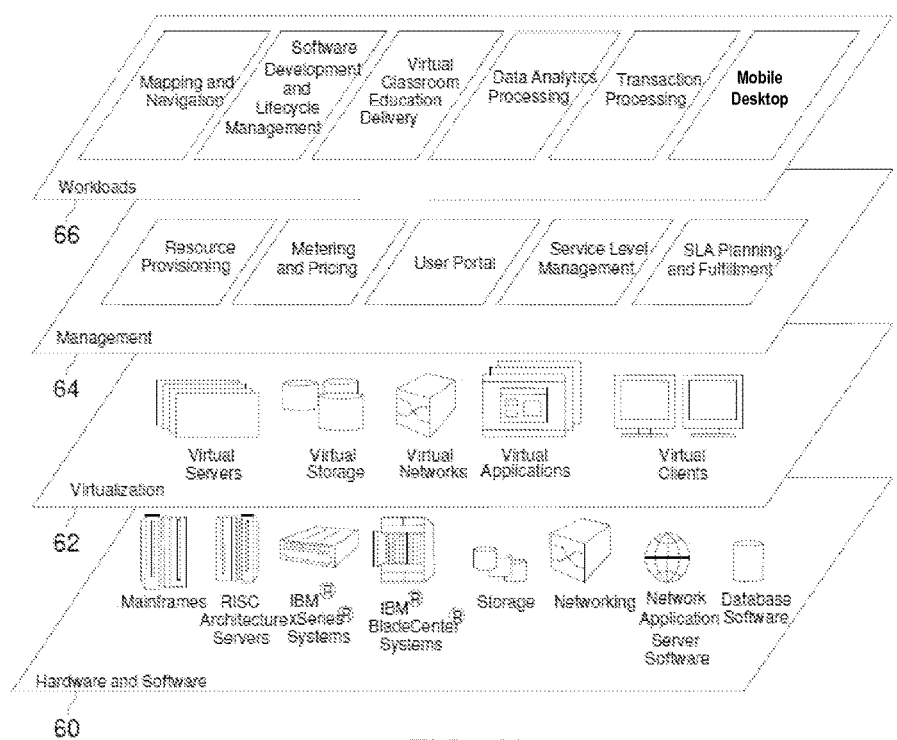
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; mobile desktop.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method of arbitrating first application and second application access to a compression and decompression engine within a coprocessor and saving coprocessor state metadata describing the contents of the compression and decompression engine to system memory connected to the coprocessor and to a processor when suspending first application access and allowing second application access to the compression and decompression engine, the method comprising:
    retaining a copy of data currently within a history first-in-first-out (FIFO) buffer within system memory;
    suspending compression operations of the compression and decompression engine by stopping data from entering the history FIFO buffer;
    upon the suspend of compression operations, clearing contents of the history FIFO buffer, and;
    writing a target empty bit count (TEBC) to system memory, the TEBC indicating the quantity of padding bits in the most recent compressed output from the compression and decompression engine.

2. The method of claim 1, further comprising:
    determining that first application access to the compression and decompression engine shall resume;
    upon the determination that first application access to the compression and decompression engine shall resume, rewinding a system memory pointer by a length equivalent to the size of the history FIFO buffer;
    writing system memory data identified by the system memory pointer to the history FIFO;
    recomputing the hash table, and;
    resuming compression operations of the compression and decompression engine with newly compressed output associated with the first application aligned to previously compressed output associated with the first application prior to the suspend of compression operations.

3. The method of claim 2 wherein the newly compressed output is aligned to the previously compressed output according to the TEBC by adding an equivalent number of padding bits as indicated by the TEBC to the newly compressed output.

4. The method of claim 1, wherein suspending compression operations occurs upon the compression and decompression engine exceeding a dynamic suspend threshold stored within the coprocessor.

5. A method of arbitrating first application and second application access to a compression and decompression engine within a coprocessor and saving coprocessor state metadata describing the contents of the compression and decompression engine to system memory connected to the coprocessor and to a processor when suspending first application access and allowing second application access to the compression and decompression engine, the method comprising:
    retaining a copy of a data decompression table utilized to decompress data within a history first-in-first-out (FIFO) buffer to system memory;
    suspending decompression operations of the compression and decompression engine by stemming data from entering the history FIFO buffer;
    upon the suspend of decompression operations, clearing contents of the history FIFO buffer and clearing contents of the decompression table, and;
    writing a source unprocessed bit count (SUBC) and writing a source final block type (SFBT) to system memory, the SUBC indicating the amount of compressed data ingested by the compression and decompression engine that was not decompressed, and the SFBT indicating a type of block that was being decoded upon the suspending first application access to the compression and decompression engine.

6. The method of claim 5, further comprising:
    determining that first application access to the compression and decompression engine shall resume;
    upon the determination that first application access to the compression and decompression engine shall resume, rewinding a system memory pointer by a length equivalent to the SUBC;
    writing system memory data identified by the system memory pointer to the history FIFO;
    recomputing the decompression table, and;
    resuming decompression operations of the compression and decompression engine with newly decompressed output associated with the first application aligned to previously decompressed output associated with the first application prior to the suspend of decompression operations.

7. The method of claim 5, wherein suspending decompression operations occurs upon the compression and decompression engine exceeding a dynamic suspend threshold stored within the coprocessor.

8. The method of claim 5, wherein the first application is stored within a first partition of the system memory and the second application is stored within a second partition of the system memory.

* * * * *